United States Patent [19]

Bernard

[11] Patent Number: 5,136,632
[45] Date of Patent: Aug. 4, 1992

[54] TELEPHONE SERVICE PAYMENT SYSTEM USING A SOUND EMITTING TOKEN

[76] Inventor: Alain Bernard, 5 rue Jules Simon, 75015 Paris, France

[21] Appl. No.: 680,550

[22] Filed: Apr. 4, 1991

[30] Foreign Application Priority Data

Apr. 5, 1990 [FR] France ............................ 90 04368

[51] Int. Cl.⁵ .......................................... H04M 17/00
[52] U.S. Cl. ..................................... 379/91; 379/112; 379/123; 379/144; 379/361
[58] Field of Search ................ 379/112, 113, 114, 91, 379/121, 123, 144, 155, 352, 561

[56] References Cited

U.S. PATENT DOCUMENTS

| | | | |
|---|---|---|---|
| 3,870,866 | 3/1975 | Halpern | 379/114 |
| 4,763,355 | 8/1988 | Cox | 379/361 X |
| 4,776,000 | 10/1988 | Parienti | 379/91 X |

FOREIGN PATENT DOCUMENTS

| | | |
|---|---|---|
| 0216521 | 4/1987 | European Pat. Off. |
| 0217308 | 4/1987 | European Pat. Off. |
| 0318454 | 5/1989 | European Pat. Off. |
| 0325302 | 7/1989 | European Pat. Off. |
| 2592188 | 6/1987 | France |
| 2624679 | 6/1989 | France |

Primary Examiner—Stafford D. Schreyer
Attorney, Agent, or Firm—Oblon, Spivak, McClelland, Maier & Neustadt

[57] ABSTRACT

A telephone service payment system having portable electronic devices (J) for transmitting a coded sequence (SQ), also involves specialized vocal host computers (SDS) and at least one affiliated computer (OA), along with a management computer (OGC). Such a telephone service payment system is used in conjunction with the placing of bets by telephone.

4 Claims, 2 Drawing Sheets

TELEPHONE SERVICE PAYMENT SYSTEM USING A SOUND EMITTING TOKEN

FIELD OF THE INVENTION

The present invention concerns a telephone service payment system.

BACKGROUND OF THE INVENTION

For payment by telephone, there are currently two techniques:

in the first technique, the price of the telephone call is billed by the network operator at a tariff allowing for a sharing of the receipts with the service supplier. In France, this technique is known as the "kiosk" technique. As the service is paid by the telephone subscriber, not always consulted at the time of using this service, this technique, should it result in billing excess sums, may give rise to problems, namely refusal of the subscriber to pay for the service. Services able to be paid for by the "kiosk" technique thus remain relatively small, in the second technique, the identity of the caller may be revealed to an operator by informing the latter of his name and secret code number. The service supplier, desirous to be paid in advance, would have the option of requiring financial cover from his potential customer and by informing him of the customer's secret code to be entered in a machine or revealed to an operator before being able to take advantage of the service required. This particular case is applicable to requests for information sent to the French "SVP" company. However, the management of subscription numbers in cumbersome. Furthermore, these code numbers remain difficult to ensure confidentiality. Finally, customers are not always prepared to take the initial step concerning subscription before having to wait for receiving a code.

SUMMARY OF THE INVENTION

The object of the invention is to overcome these drawbacks by offering a fast, anonymous and safe means of payment.

To this end, the invention proposes a telephone service payment system which first of all includes portable electronic devices each having a specific identity, a face value and a time limitation date, each device being able to transmit, as when ordered by the user, a coded sequence of acoustic tones, this sequence being characteristic of the identity of the device, the date of use and a particular service.

One particular embodiment of such electronic devices is described in the patent application applied for by Alain BERNARD on the date of filing of this application and entitled "Electronic telephone device". But other devices may be used when they fulfill the same functions.

The system of the invention also includes specialized vocal host computers in a particular service and connected to a telephone line, these host computers being able to be called up by a user and being able to receive a coded sequence of acoustic tones transmitted by the electronic device of the caller and translate this sequence into data processing data.

These vocal host computers may be specialized, for example as regards bets on horse races, such as the Pari Mutuel Urbain (PMU) in France or in weather forecasts.

The system further includes computers affiliated to a particular service and connected to specialized host computers within this service by means of a data processing data transmission line, these computers being able to define a transaction corresponding to the service in question.

In this preceding example, these affiliated computers would be attached to the PMU and the weather forecasts.

Finally, the system of the invention includes an accounts management computer, these accounts corresponding firstly to the various service suppliers and secondly to the various portable electronic devices; this accounts management computer is connected to the computers affiliated to the various services by data transmission lines from which it receives for each transaction to be effected the sequence of coded data relating to the portable electronic device used, as well as the characteristics of the transaction to be effected; this accounts management computer is able to decode the sequence of data it receives, identify the corresponding account and to debit or credit the latter according to the transaction to be effected.

For example, the data transmission lines may be networks, such as TRANSPAC networks.

The system preferably further includes at least one interactive vocal host computer directly connected to the accounts management computer, this host computer solely giving the calling user the position of the account corresponding to the portable device used.

BRIEF DESCRIPTION OF THE DRAWINGS

The characteristics and advantages of the invention shall appear more readily from a reading of the following embodiment example, given by way of explanation and being non-restrictive, with reference to the accompanying drawings on which.

DETAILED DESCRIPTION OF THE PREFERRED EMBODIMENTS

Figure 1:
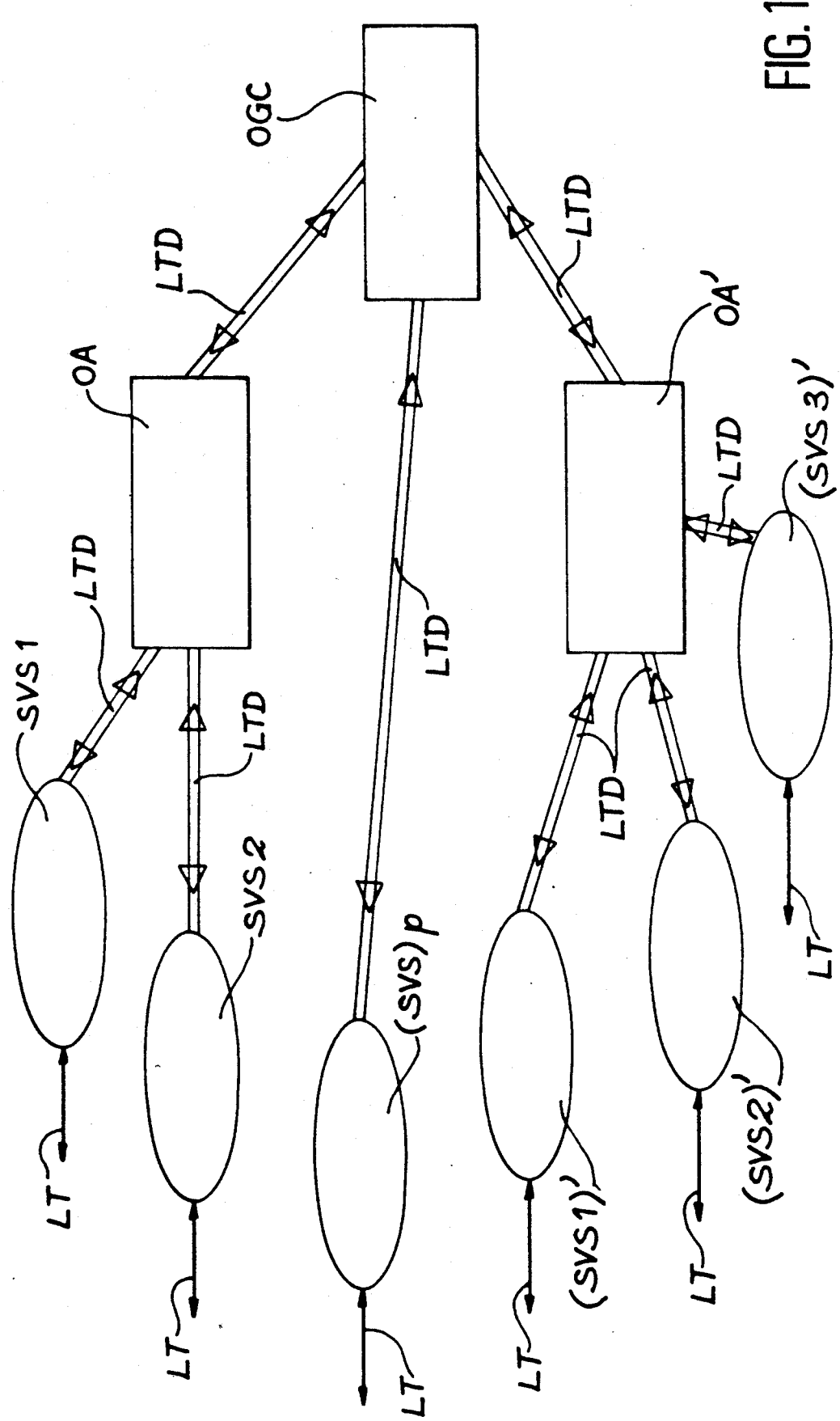
FIG. 1 represents the general structure of a system conforming to the invention.

The system shown on FIG. 1 includes interactive vocal host computers specialized for a particular service, namely SVS1, SVS2 for one first service, and (SVS1)', (SVS2)', (SVS3)' for a second service. Each host computer is connected to a telephone line LT. A computer (OA), (OA)' affiliated to each service is connected to the host computers by means of a data transmission line LTD. An OGC computer manages the accounts of the users of the service and service suppliers and is connected to the two affiliated computers OA and OA'.

Figure 2A:
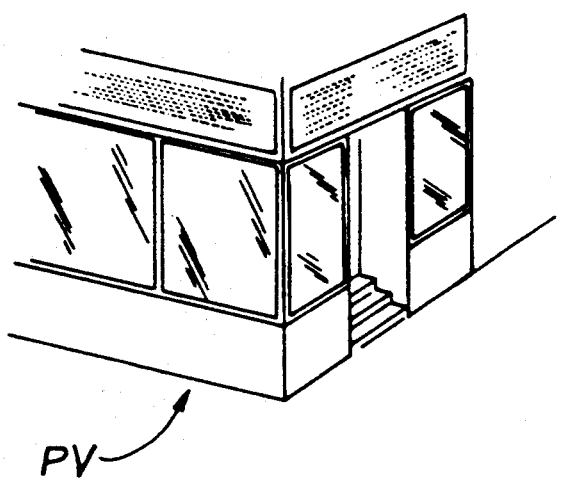
FIGS. 2a, 2b and 2c show in detail a system for taking bets on horse races.
Figure 2B:
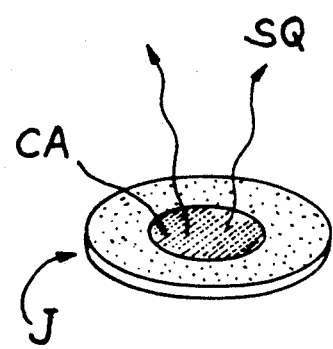
Figure 2C:
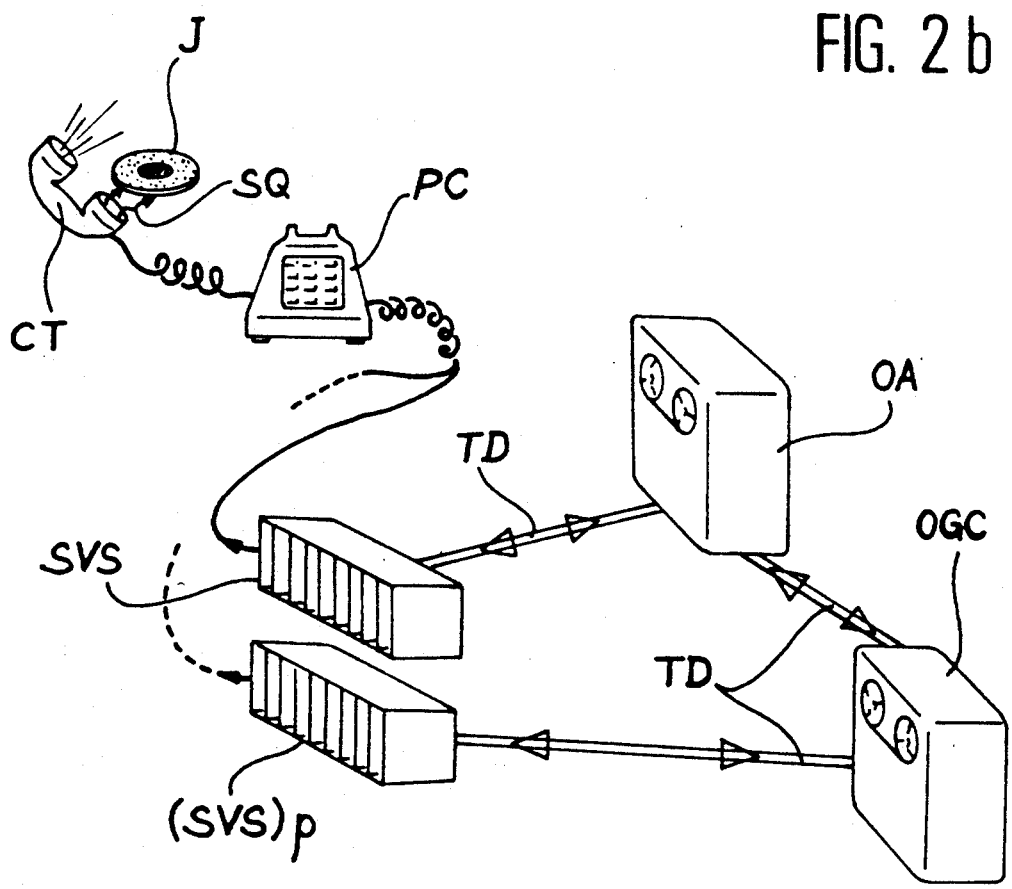

FIGS. 2a, 2b and 2c illustrate the functioning of the system where this concerns the taking of bets on horse races (PMU) and in the case where the portable electronic device is a token of the type of the one described in the parallel patent mentioned earlier.

The tokens are sold and bought back at a point of sale of sales outlet PV (FIG. 2a). Each token J (FIG. 2b) appears in the form of a plastic or resin washer marked with a value of 500, 1000 or 2000 francs for example, and with a time limitation data, such as 6 months after the initial use date. This washer is equipped with an acoustic coupler CA which, by pressing on a push-button (not visible on FIG. 2b), enables the latter to transmit a set of figures SQ characteristic of the token and guaranteeing, with a probability of about 1 out of 10 billion, that it clearly belongs to the system. This transmission is possible throughout the period of life of the token until its time limitation date.

When functioning (FIG. 2c), such a token is disposed opposite the microphone of a telephone handset CT.

A user who has bought such a token for 1000 francs, for example, in a point of sale, calls a host computer SVS for taking bets. This host computer allows him to define his bet with the aid of a vocal frequency keypad station PC. In order to validate this bet, the user brings his token close to the microphone of the handset and presses on the push-button. The token transmits a sequence SQ.

The host computer SVS transforms this acoustic signal into a set of data processing data which is transmitted with the bet by the TRANSPAC network TD to the computer OA affiliated to the PMU. The latter checks the consistency of the bet, calculates the amount played and transmits to the accounts management computer OGC the sequence SQ, the amount of the bet and the transaction number.

The accounts management computer OGC decodes the sequence SQ. It checks that the token genuinely belongs to the system and calculates its identification number N. If it does not recognise this number because the token is used for the first time, it opens a new account and allocates to it an initial credit equal to 1000 francs. If it does recognise the number N, the credit already exists. This credit is debited by the amount of the bet and the account of the PMU is credited with the amount of the bet. A message is sent on return to the computer OA of the MPU informing it that the transaction is in order or that the token is false or that the account does not possess sufficient funds to cover the bet. The information is sent to the host computer SVS for consultation by the punter.

The computer OGC next blocks the account of the token for a certain period of time, such as several minutes. The aim of this blocking is to see whether the token, which includes a clock changing the sequence SQ, has programmed another sequence. Thus, it is impossible to conduct several transactions with the same sequence SQ.

If the bet were a winning bet, the computer OA of the PMU informs the accounts management computer OGC that the bet bearing such a number wins such a sum. The computer OGC, which is able to make the link between the transaction number and the account number N, credits the account N and debits the account PMU.

When the punter considers that his account, which furnishes him with the amount each time with which he is identified, reaches a sufficient level, he can resell his token to anyone who then becomes the holder of the amount of the account N. The two participants in the transaction obtain information by calling a special number corresponding to a particular interactive host computer (SVS)p (FIG. 2c) giving solely the position of the accounts, this host computer directly calling the computer holding the OGC accounts which furnishes the last recorded value of the account.

Before the token reaches its time limitation date and has not expired, its owner needs to contact a specialized body which buys the token from him and destroys it. In any event, the computer OGC destroys those accounts open for more than 6 months.

As regards these transactions, it shall be observed that anonimity is always respected.

Of course, this example of application of the system of the invention is merely given by way of explanation. The system may be used to pay for other services, provided the latter have an open account with the OGC computer. For example, it is possible to imagine that a body, such as SVP in France, which sells information via operators, is a member of the system. In this case, the vocal host computer SVS would only be connected for one part of the telephone call so as to receive the signal from the token and transmit it to the OGC computer. A dialogue may be installed during which the operator informs his customer that, if the latter requires more information, this shall cost him 100 francs; if the latter agrees, he is connected to the host computer for payment. Where a customer agrees, with a small terminal, the operators types 100 francs, the host computer receives the sequence SQ of the customer and transmits it to the affiliated computer SVP which adds the 100 francs. This computer sends the whole amount with the SVP account number to the OGC computer so that the SVP account is credited with 100 francs and the account of the token is debited by 100 francs.

What is claimed is:

1. Telephone service payment system, wherein it includes:
   portable electronic devices each having a specific identity, a face value and a time limitation date, each device being able to transmit when ordered by the user a coded sequence of acoustic tones, this sequence being characteristic of the identity of the device, the date of use and a particular service,
   specialized vocal host computers in a particular service and connected to a telephone line, these host computers being able to be called by the user and able to receive the coded sequence of acoustic tones transmitted by the portable electronic device of the calling user and to translate this sequence into data processing data,
   at least one computer affiliated to a particular service and connected to the specialized vocal host computers in this service by means of a data processing data transmission line, this computer being able to define a transaction corresponding to the service in question,
   an accounts management computer, these accounts corresponding firstly to the various service suppliers, and secondly to the various portable electronic devices in service, this accounts management computer being connected to the computers affiliated to the various services by data transmission lines from which it receives for each transaction to be effected the sequence of coded data belonging to the electronic device used, as well as the characteristics of the transaction to be effected, this accounts management computer being able to decode the sequence of data it receives, identify the corresponding account and to debit or credit the latter according to the transaction to be effected.

2. System according to claim 1, wherein the accounts management computer creates during the first use of a portable electronic device an account allocated to this device with the credit bearing the face value of the device and a closing date, namely the time limitation date of the device.

3. System according to claim 1, wherein the accounts management computer only accepts for each portable device a single transaction defined by the affiliated computers throughout the period in which the device transmits a given coded sequence.

4. System according to claim 1, wherein it further includes at least one interactive vocal host computer directly connected to the accounts management computer, this host computer only providing the caller user with the position of the account corresponding to the portable device used.

* * * * *